United States Patent
Ell

(10) Patent No.: US 7,856,811 B2
(45) Date of Patent: Dec. 28, 2010

(54) SHIELDING COMPONENT, A HEAT SHIELD IN PARTICULAR

(75) Inventor: Bernd Ell, Grosshabersdorf (DE)

(73) Assignee: ElringKlinger AG, Dettingen/Erms (DE)

( * ) Notice: Subject to any disclaimer, the term of this patent is extended or adjusted under 35 U.S.C. 154(b) by 1206 days.

(21) Appl. No.: 11/349,546

(22) Filed: Feb. 8, 2006

(65) Prior Publication Data

US 2006/0179828 A1  Aug. 17, 2006

(30) Foreign Application Priority Data

Feb. 11, 2005  (DE) .................. 10 2005 006 320

(51) Int. Cl.
*F01N 3/00* (2006.01)

(52) U.S. Cl. .............. 60/298; 60/320; 60/321; 180/89.2; 180/309

(58) Field of Classification Search ............. 60/299, 60/320, 321, 323, 298; 180/89.2, 296, 309
See application file for complete search history.

(56) References Cited

U.S. PATENT DOCUMENTS

| | | | | |
|---|---|---|---|---|
| 3,425,456 A | * | 2/1969 | Schibig | ............. 138/162 |
| 3,904,379 A | | 9/1975 | Oser | |
| 5,211,013 A | * | 5/1993 | Bonde et al. | ............ 60/323 |
| 5,831,357 A | * | 11/1998 | Stohler et al. | ............. 310/52 |
| 6,251,498 B1 | * | 6/2001 | Fukushima et al. | ......... 428/164 |
| 6,315,005 B1 | * | 11/2001 | Sproule, III | ............. 138/149 |
| 6,598,389 B2 | * | 7/2003 | Chen et al. | ............. 60/323 |
| 6,647,715 B2 | * | 11/2003 | Farkas | ............. 60/323 |
| 6,827,173 B2 | * | 12/2004 | Lai | ............. 180/309 |
| 6,851,506 B2 | * | 2/2005 | Bovio | ............. 180/296 |
| 7,146,807 B1 | * | 12/2006 | Mondelci | ............. 60/321 |
| 7,162,868 B2 | * | 1/2007 | Funakoshi | ............. 60/323 |
| 7,284,748 B2 | * | 10/2007 | Mishima | ............. 267/140.11 |
| 7,401,463 B2 | * | 7/2008 | Tsuruta | ............. 60/320 |
| 7,458,209 B2 | * | 12/2008 | Hofmann et al. | ............. 60/322 |

FOREIGN PATENT DOCUMENTS

| | | |
|---|---|---|
| DE | 36 44 690 C1 | 8/1987 |
| DE | 198 24 943 A1 | 12/1999 |
| DE | 100 02 950 A1 | 8/2001 |
| DE | 201 06 007 U1 | 9/2002 |
| DE | 102 47 641 B3 | 1/2004 |
| EP | 0 805 619 B1 | 2/2001 |

* cited by examiner

*Primary Examiner*—Tu M Nguyen
(74) *Attorney, Agent, or Firm*—Roylance, Abrams, Berdo & Goodman, LLP

(57) ABSTRACT

A shielding component, a heat shield in particular, has at least two shield components (10, 12) detachably connected to each other by a connection unit. The connection unit has at least one snap fastener (16), with the stud element (18) connected to one shield component (10) and with the eyelet element (22) connected to the other shield component (12). The shield components may be reliably separated from each other and reconnected to each other with exertion of little manual effort.

26 Claims, 2 Drawing Sheets

SHIELDING COMPONENT, A HEAT SHIELD IN PARTICULAR

FIELD OF THE INVENTION

The present invention relates to a shielding component, a heat shield in particular, having at least two shield components detachably connected to each other by a connection unit.

BACKGROUND OF THE INVENTION

While the heat such as that evolved by a cost-effective optimized-efficiency diesel engine may be very low on the cylinder crankshaft housing, this circumstance is not the case for "hot zones" at manifolds, turbochargers, catalytic converters, etc. As a result of the increasingly compact design of the engines, components that are not thermally "compatible" are coming to be in ever closer proximity. The use of shielding components such as heat shields is needed to protect adjacent heat-sensitive assemblies such as sensors, fuel lines, barometric cells, body parts, and so forth from heat-generating engine components. The situation is intensified by the compact design in that the high assembly packing density narrows the cooling air stream. Noise abatement measures may also contribute to the problem. For example, plastic floor plates having the function of reducing the level of sound escaping from the engine compartment to the roadway may possibly cause effective insulation whereby heat is trapped in the engine compartment. Because of their high surface temperature in some phases, catalytic converters are among the sources of heat necessitating use of protective shield barriers. A typical example is that of design measures such as positioning the catalytic converter in the immediate vicinity of the manifold. This design principle, serving the purpose of rapid heating of the catalytic converter and thereby of reducing emissions during the cold start phase, transfers a strong heat source into the engine compartment, where a considerable number of assemblies are crowded into restricted space. Another reason for the increasing importance of shielding components such as heat shields is the trend toward use of thermoplastics. These outstandingly moldable, light, and economically efficient materials are employed with increasing frequency in the engine compartment, but require special attention in view of the ambient temperatures generated at the site of application in connection with other heat-generating engine parts (New Materials and Development Tools for Protection from Heat in MTZ 12/2001, Vol. 62, page 1044 et seq.)

DE 102 47 641 B3 discloses a generic structural component, in particular one in the form of a sound-damping shielding component, as a structural element of a motor vehicle. In this disclosed solution, to improve sound damping the shielding component includes a shielding body having a base edge as structural element of a first type. The body may be fastened on the edge side by angular U-shaped elements inside the engine compartment to stationary elements mounted in that compartment, and shields heat-generating engine components from heat-sensitive structural components.

The shielding body as structural element is a U-shaped arch in a central area, and is configured to be symmetrical for this purpose. The U-shaped central area undergoes transition on the edge side to edge areas of more pronounced curvature. The U-shaped arches on the two edge areas opposite each other are subsequently mounted as fastening means. The shielding body has two sheet metal layers between which extends a sound-absorbing and/or heat-insulating layer. A border in which the flanged edge of one cover layer covers the edge area of the other cover layer is used for fastening the metal cover layers to each other. To save weight, the shielding body may be made of aluminum or another light metal.

The disclosed solution is applied by preference to shield a coupling between a drive flange and a drive shaft from the sound of the body coming from the gearing and to avoid a long-term effect through thermal radiation of an adjacent exhaust gas pipe. Experiments were conducted in which the sound emission was reduced by 3 dB in the disclosed solution. If in the disclosed solution maintenance or repair work on the coupling or the drive shaft becomes necessary, the shield component normally must be disassembled. The disassembly requires separating the shielding body by loosening a connection unit in the form of screws from the angular U-shaped elements as fastening means. This disassembly is time-consuming and consequently increases maintenance and repair costs. If it is desired only to inspect the shielded components in the context of maintenance, complete disassembly of the shielding body on the engine structural components or body parts is normally also necessary, depending on the installation conditions.

Spring clips have in fact also been described in the state of the art as being used to connect shielding components detachably to each other or to fasten such clips reversibly on engine structural components or body parts of a vehicle to eliminate the time-consuming screw connection process. However, those spring clips are often complicated and expensive to produce and, especially in disassembly of such shielding components, expand together with their shackles so that the elastic effect is largely lost. The elastic effect loss results in the spring clips becoming unusable for a new fastening process. In addition, as additional assembly elements they must be handled and stored.

SUMMARY OF THE INVENTION

An object of the present invention is to provide an improved shielding component while retaining its advantages, specifically, ensuring very good sound and heat insulation, where at least parts of it may be reliably assembled and disassembled even in long-term use and where the cost of a solution such as this is reduced.

This object is basically attained by a shielding component having a connection unit formed of at least one snap fastener. The stud element of the snap fastener is connected to one shield component. The eyelet element of the snap fastener is connected to the other shield component. The shield components may be reliably separated from each other and connected to each other again manually by application of slight operating forces. Snap fastener connections as such are known from the textile industry (DE 36 44 690 C1, DE 198 24 943 A1), for detachably connecting articles of clothing, for example, for closing a jacket opening or the like. Snap fastener connection units such as this operate reliably even after a large number of opening and closing processes, and effectively complete a positive frictional connection. In addition, snap fasteners may be fastened to products, including ones in the form of shield components with no additional elements or special assembly devices, and remain there captive. These abilities are advantages, for example, over the spring clip solutions which must be delivered as an independent component along with the shield components and be kept in storage in advance of assembly.

The snap fastener connection may be closed and opened manually in only one operating step. The rounded snap fastener elements (stud element and eyelet element) counteract a potential risk of injury such as may be presented by sharpedged clip elements. If the snap fastener is formed of metal, it is heat resistant and may also be applied for heat shields. Simple unbuttoning of one shield component from the other by the snap fastener connection unit results in uncovering of high-maintenance engine and machinery areas. The expenditure of time for maintenance and repair may then be reduced. Consequently, removal of a shield component by the snap fastener connection unit permits servicing of lubrication points on the engine or machinery, a process which otherwise involves significant disassembly operations for the respective shield component in the conventional solutions. It has been found to be especially advantageous to leave one shield component at a point which need not be accessible, and configure the other shield component to be easily detachable from it by the snap fastener connection unit.

In one preferred embodiment of the shielding component of the present invention, one shield component is configured to be rigid and the other shield component is configured to be flexible. By preference, the flexible shield component is mat-like in structure and preferably is formed at least in part of a heat-resistant plastic fabric. As a result of that configuration, the mat-like fabric as a flexible shield component may be produced in a large number of geometric configurations corresponding to those of the shape of engine and machinery components and body parts, something which in the aggregate increases flexibility of assembly. The mat-like structure may also be applied especially to vibrating components and effectively damps the noise of the body, something which a comparably rigid shield component could not do.

In another preferred embodiment of the shielding component of the present invention, a colored marking is present on at least one shield component at least in the area of fastening of the stud element or eyelet element. As a result of this marking, for example, in the form of identification by color, in the snap fastener area, clear-cut association of shield components corresponding to each other which are to be installed may be achieved. This color coding is found to be a positive factor especially on motor vehicle production lines where different modifications of a motor vehicle are built on a particular production line and possibly are to be provided with different shielding components.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are not drawn to scale.

DETAILED DESCRIPTION OF THE INVENTION

Figure 1:
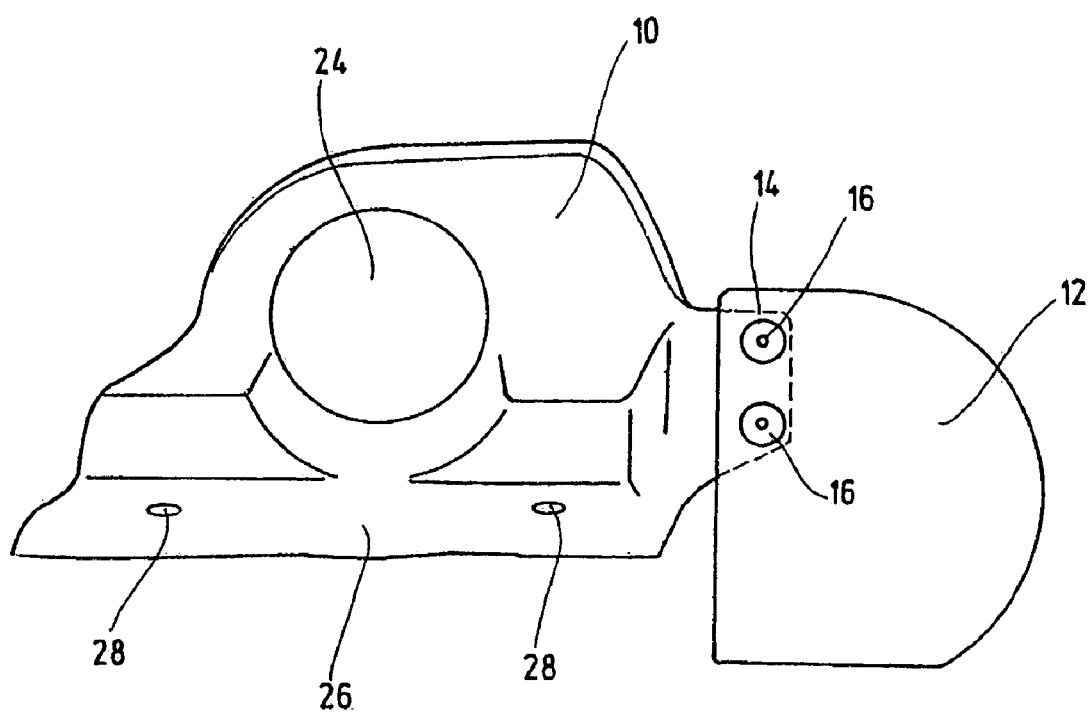
FIG. 1 is a perspective front view of a shielding component according to an exemplary embodiment of the present invention, formed essentially of two individual shield components connected to each other.

The shielding component of the present invention may be used in particular as a heat shield, and has two individual shield components 10, 12 detachably connected to each other by a connection unit 14. The connection unit 14 has two or primary and secondary snap fasteners 16 mounted sequentially one above the other. The stud element 18 of each snap fastener 16 extends through a plate-shaped web-like extension or portion 20 of one or a first shield component 10 in the same direction parallel to each other and perpendicular to a planar surface of a plate-shaped extension, providing the possibility of engagement by the corresponding eyelet element 22 in the other or a second shield component 12. Such snap fasteners 16 have been described in a multiplicity of embodiments in the prior art clothing industry in particular, and accordingly will not be described in detail at this point.

Figure 2:
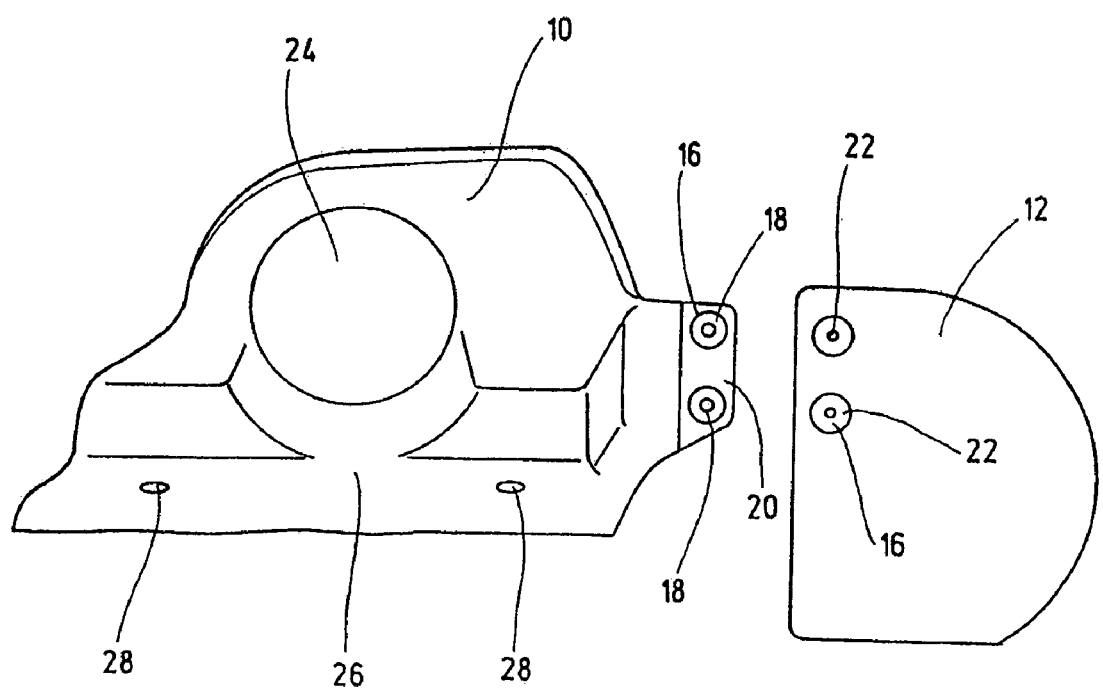
FIG. 2 is a perspective front view of the two shield components of FIG. 1 before connection thereof by a snap fastener connection unit.

The eyelet elements 22 extend through a plate-shaped portion of component 12 in the same direction parallel to one another and perpendicular to a planar surface of that plate-shaped portion, and are spaced adjacent from each other at a distance such that, when the shield component 12 is horizontally oriented, its eyelet openings may be locked on the projecting stud elements 18 of the snap fasteners 16 in the first shield component 10. For this purpose, the second shield component 12 is to be positioned on the first shield component 10 as viewed in FIG. 2 along the web-like extension 20. The two snap fasteners 16 are to be secured against each other so that the connection and accordingly the shield component as shown in FIGS. 1 and 2 is obtained. As regards the illustrations in FIGS. 1 and 2, a view of the rear or opposite of the eyelet element 22 presents the opening for the associated stud element 18 and is not shown in detail.

In the exemplary embodiment, the first shield component 10 of a shielding component comprises a one-layer shaped sheet metal part having an eyelet-shaped center recess 24. As viewed in FIG. 1, recess 24 is integrated with a box-shaped widening having support component 26 through which extend two openings 28. Openings 28 permit fastening the shielding component to a part of the vehicle (not shown), such as one in the form of a steering knuckle or the like.

To the right in FIG. 1 the second shield component 12 is joined to the first shield component 10. As is shown in FIG. 1, the second shield component 12 is detachably connected to the first shield component 10 by the connection unit 14. As viewed in FIG. 2, the connection unit is separated, and the second shield component 12 is removed from the first shield component 10. In place of a one-layer shaped sheet metal component, first shield component 10 may also be configured to be in multiple layers. For example, it may have thermal and acoustic damping (not shown) between sheet metal cover layers. If the damping is extended to extension 20, the stud element 18 must extend both through the sheet metal layer of the shield component 10 as well as through the damping layer. In the embodiment illustrated, the other or second shield component 12 is configured to be flexible and in particular is of a mat-like structure made up at least in part of a plastic fabric, preferably possessing thermal resistance properties.

The plastic fabric accordingly is formed of heat-resistant fibers, such as aramide fibers, carbon fibers, or mineral fibers. The fibers may be replaced at least in part by corresponding threads of the same materials. The fabric, including a multi-layer fabric, may be in the form of warp or weft fibers or configured as a cluster or laminate. In any event, the plastic fabric or cluster may be provided with metal components, for example, by applying heat-resistant metal materials by coating, spray or ductor blade application being particularly well-suited for this purpose.

In the exemplary embodiment illustrated in the figures, the second shield component 12 is provided on its side facing away from the first shield component 10 with a semicircular sealing bow. A level or flat blank is selected as shield component 12 in the form of a detachable cover flap to ensure accessibility of engine and machine parts in the area of the steering knuckle, so as to facilitate maintenance and inspection operations, including lubrication. Since the shield component 12 as a flat blank is highly flexible, this shield component 12, especially if made of greater geometric extent, may be folded away from the point involved without the need for immediately releasing the snap fastener connection unit. In the exemplary embodiment illustrated, of course, release of the respective snap fastener 16 yields the accessibility described, through removal of the second shield component 12 from the first shield component 10, as indicated.

Because of the special fiber or thread structure of the second shield component 12, this component is characterized by low heat conduction, so that operation by hand is possible after a brief cooling period. In addition to selection of a flat blank for the second shield component 12, its geometric configuration may also be very freely selected as a function of the fabric or cluster selected. Space may then be saved in this way in providing a protective covering even for engine and machine parts of geometrically complex shape. Like the first shield component 10, the second shield component 12 may be formed of a shaped element (not shown). In selection of heat-resistant flexible materials, configuration of the second shield component 12 as a fiber glass mat has been found to be of particular advantage in practical experiments.

The first shield component 10 may have a marking, especially in the area of the web-like extension 20, especially one in the form of an identifying color (not shown). The marking permits better association of the different shield components differing in design. When use is made of the same markings, especially ones in the form of identifying colors, for both the shield component 10 and shield component 12, pairs to be fastened may be recognized. This association can facilitate operation especially on production lines in motor vehicle manufacture. In addition, the shield component 10 may be of a surface structure (not shown in detail) to permit improved heat emission as a result of the larger surface area thereby obtained.

The connection unit 14 of the present invention represents a connection which may be separated as often as desired, and requires no additional components or on-site assembly devices, especially on a vehicle production line. Consequently, the number of added structural components in the volume to be delivered and the number of production steps required may be kept low.

While one embodiment has been chosen to illustrate the invention, it will be understood by those skilled in the art that various changes and modifications can be made therein without departing from the scope of the invention as defined in the appended claims.

What is claimed is:

1. A heat shield, comprising:
   first and second shield components having first and second plate-shaped portions, respectively, said first shield component being rigid, said second shield component being flexible; and
   a snap fastener unit detachably connecting said first and second shield components, said unit including a primary stud element extending through said first plate-shaped portion and a primary eyelet element extending through said second plate-shaped portion, said stud element and said eyelet element being releasably engageable.

2. A heat shield according to claim 1 wherein
   said first shield component comprises a molded sheet metal element; and
   said second shield component comprises a flat blank.

3. A heat shield according to claim 1 wherein
   said snap fastener unit comprises a secondary stud element extending through said first plate-shaped portion in sequence relative to said primary stud element, and a secondary eyelet element extending through said second plate-shaped portion in sequence relative to said primary eyelet element, said secondary stud element and said secondary eyelet element being releasably engageable.

4. A heat shield according to claim 1 wherein
   a color marking is on at least one of said plate-shaped portions adjacent one of said stud element and said eyelet element.

5. A heat shield according to claim 1 wherein
   said second shield component is at least in part a plastic fabric.

6. A heat shield according to claim 5 wherein
   said plastic fabric is heat resistant and is formed of at least one of the group consisting of aramide fibers and threads, carbon fibers and threads and mineral fibers and threads.

7. A heat shield, comprising:
   rigid and flexible shield components having first and second portions, respectively; and
   a snap fastener unit detachably connecting said rigid and flexible shield components, said unit including a primary rigid stud element extending through one of said portions and a primary resilient eyelet element extending through the other said portions, said stud element and said eyelet element being releasably engageable.

8. A heat shield according to claim 7 wherein
   said rigid shield component comprises a molded sheet metal element; and
   said flexible shield component comprises a flat blank.

9. A heat shield according to claim 7 wherein
   said snap fastener unit comprises a secondary rigid stud element extending through the one of said portions in sequence relative to said primary rigid stud element, and a secondary resilient eyelet element extending through the other of said portions in sequence relative to said primary resilient eyelet element, said secondary rigid stud element and said secondary resilient eyelet element being releasably engageable.

10. A heat shield according to claim 7 wherein
    a color marking is on at least one of said portions adjacent one of said stud element and said eyelet element.

11. A heat shield according to claim 7 wherein
    said flexible shield component is at least in part a plastic fabric.

12. A heat shield according to claim 11 wherein
    said plastic fabric is heat resistant and is formed of at least one of the group consisting of aramide fibers and threads, carbon fibers and threads and mineral fibers and threads.

13. A heat shield, comprising:
    first and second shield components having first and second plate-shaped portions, respectively, said first shield component being rigid, said second shield component being flexible; and
    a snap fastener unit detachably connecting said first and second shield components, said unit including primary and secondary stud elements extending in a same direction through said first plate-shaped portion parallel to one another and perpendicular to a planar surface of said first plate-shaped portion and including primary and secondary eyelet elements extending in a same direction through said second plate-shaped portion parallel to one another and perpendicular to a planar surface of said second plate-shaped portion, said stud elements and said eyelet elements being releasably engageable.

14. A heat shield according to claim 13 wherein
said first shield component comprises a molded sheet metal element; and
said second shield component comprises a flat blank.

15. A heat shield according to claim 13 wherein
a color marking is on at least one of said plate-shaped portions adjacent one of said stud elements and said eyelet elements.

16. A heat shield according to claim 13 wherein
said second shield component is at least in part a plastic fabric.

17. A heat shield according to claim 16 wherein
said plastic fabric is heat resistant and is formed of at least one of the group consisting of aramide fibers and threads, carbon fibers and threads and mineral fibers and threads.

18. A heat shield, comprising:
first and second shield components having first and second plate-shaped portions, respectively, said first shield component being a molded sheet metal element, said second shield component being a flat blank; and
a snap fastener unit detachably connecting said first and second shield components, said unit including a primary stud element extending through said first plate-shaped portion and a primary eyelet element extending through said second plate-shaped portion, said stud element and said eyelet element being releasably engageable.

19. A heat shield according to claim 18 wherein
said snap fastener unit comprises a secondary stud element extending through said first plate-shaped portion in sequence relative to said primary stud element, and a secondary eyelet element extending through said second plate-shaped portion in sequence relative to said primary eyelet element, said secondary stud element and said secondary eyelet element being releasably engageable.

20. A heat shield according to claim 18 wherein
a color marking is on at least one of said plate-shaped portions adjacent one of said stud element and said eyelet element.

21. A heat shield according to claim 18 wherein
said second shield component is at least in part a plastic fabric.

22. A heat shield according to claim 21 wherein
said plastic fabric is heat resistant and is formed of at least one of the group consisting of aramide fibers and threads, carbon fibers and threads and mineral fibers and threads.

23. A heat shield, comprising:
first and second shield components having first and second plate-shaped portions, respectively, said first shield component comprises a mold sheet metal element, said second shield component comprises a flat blank; and
a snap fastener unit detachably connecting said first and second shield components, said unit including primary and secondary stud elements extending in a same direction through said first plate-shaped portion parallel to one another and perpendicular to a planar surface of said first plate-shaped portion and including primary and secondary eyelet elements extending in a same direction through said second plate-shaped portion parallel to one another and perpendicular to a planar surface of said second plate-shaped portion, said stud elements and said eyelet elements being releasably engageable.

24. A heat shield according to claim 23 wherein
a color marking is on at least one of said plate-shaped portions adjacent one of said stud elements and said eyelet elements.

25. A heat shield according to claim 23 wherein
said second shield component is at least in part a plastic fabric.

26. A heat shield according to claim 25 wherein
said plastic fabric is heat resistant and is formed of at least one of the group consisting of aramide fibers and threads, carbon fibers and threads and mineral fibers and threads.

* * * * *